April 14, 1970  R. D. LURIE  3,506,751
METHOD OF DRAWING PLASTIC CONTAINERS
Filed May 3, 1968  2 Sheets-Sheet 1
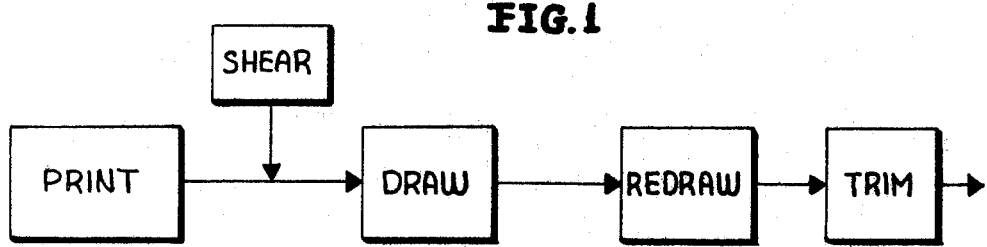
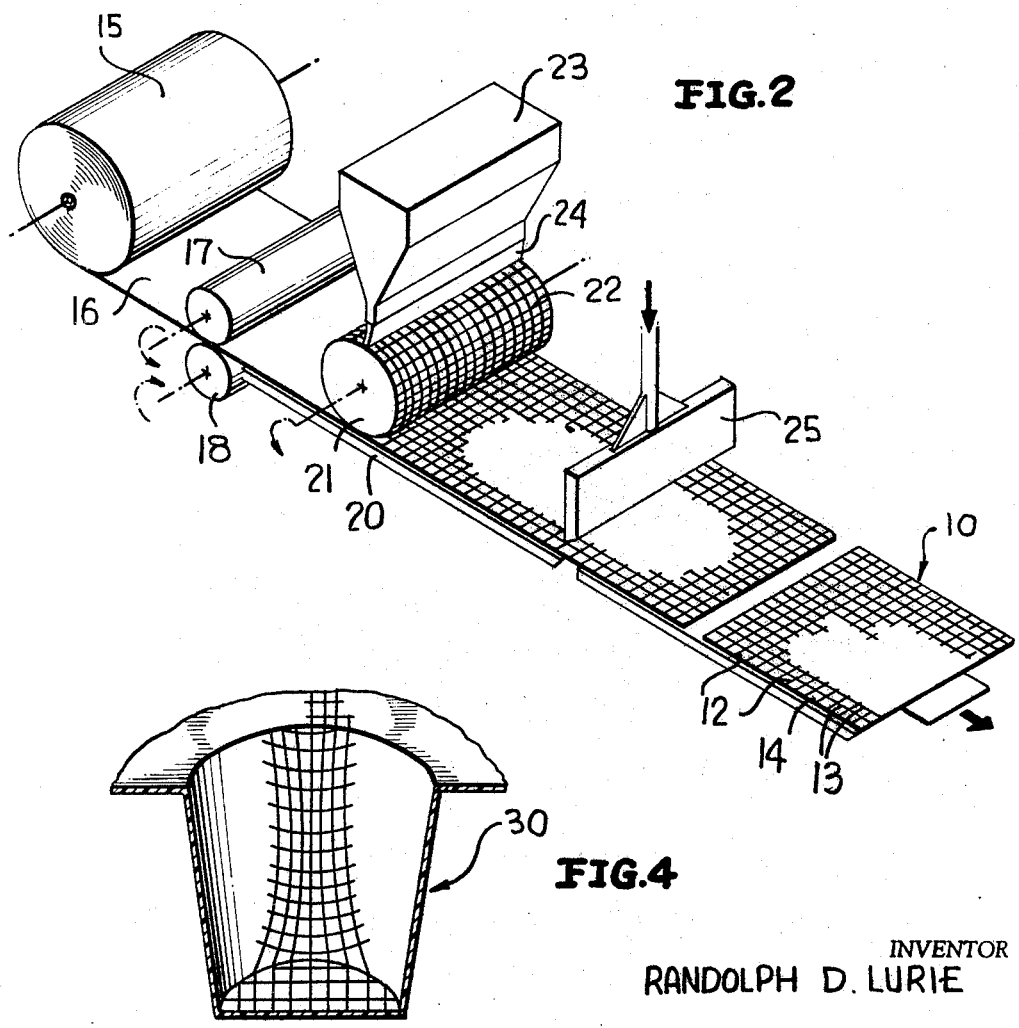
INVENTOR
RANDOLPH D. LURIE April 14, 1970     R. D. LURIE     3,506,751
METHOD OF DRAWING PLASTIC CONTAINERS
Filed May 3, 1968     2 Sheets-Sheet 2
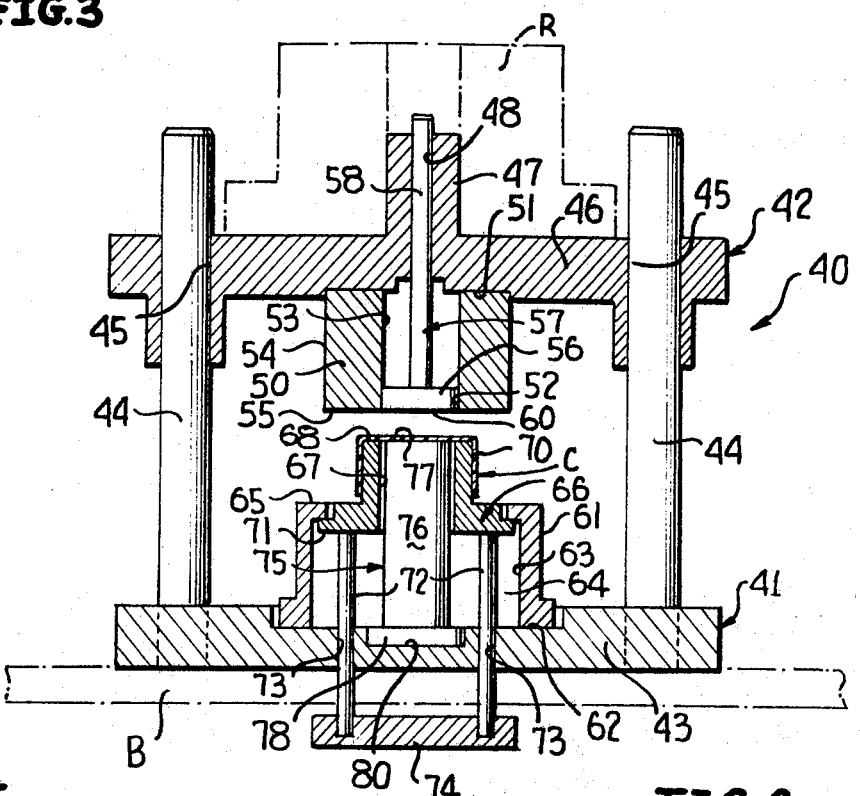
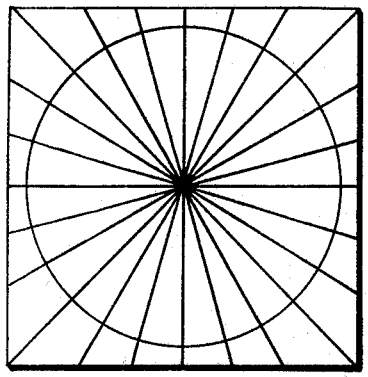
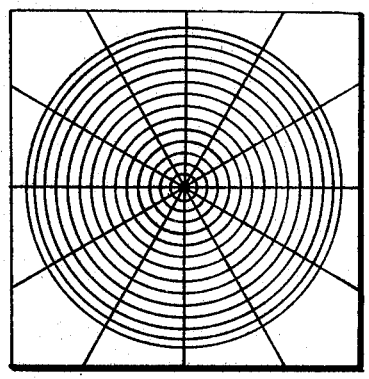
INVENTOR
RANDOLPH D. LURIE
BY
Mason, Porter, Diller & Brown
ATTORNEYS United States Patent Office 3,506,751
Patented Apr. 14, 1970

3,506,751
METHOD OF DRAWING PLASTIC CONTAINERS
Randolph D. Lurie, Parkersburg, W. Va., assignor to Continental Can Company, Inc., New York, N.Y., a corporation of New York
Continuation-in-part of abandoned application Ser. No. 360,957, Apr. 20, 1964. This application May 3, 1968, Ser. No. 726,384
Int. Cl. B32b *31/12;* B29c *17/03*
U.S. Cl. 264—134                                    11 Claims

ABSTRACT OF THE DISCLOSURE

This disclosure relates to a method of forming plastic containers by first applying a pattern of coating material material to a surface of a plastic sheet, and thereafter drawing the sheet in a conventional die assembly with the coating material in opposition to a male punch whereby during the drawing operation "necking" or thinning of the plastic material heretofore commonly formed by conventional methods as eliminated.

This application constitutes a continuation-in-part of my commonly assigned co-pending application Ser. No. 360,957 filed Apr. 20, 1964, now abandoned.

During a conventional drawing process, a generally planar sheet of thin drawable plastic material is drawn to a generally cup-like configuration by means of a male punch or die center pad and a female die. The container tends to "neck down" or thin in a peripheral area thereof adjacent the juncture of the peripheral body wall and the bottom wall. This "necking" or thinning of the material is most prevalent during a conventional redrawing operation, but can also result during any conventional drawing operation.

As a result of the formation of this "neck" of thin material one of three things may happen to the drawn container.

First, the material of the container may strain harden enough to cause a brittle break in the material. This may easily cause the bottom wall of the container body to be punched out during the drawing or redrawing operation.

Secondly, the neck of thinned material may propagate further along the container body wall and/or the bottom wall, thus rendering the container commercially useless.

Finally, the material of the container may strain harden in the neck area but the tensile forces may be too weak to tear the material, thus forming a thin but relatively strong and highly oriented band around the container body.

This problem of thinning or necking may be solved in various ways as, for example, by increasing the number of redrawing operations before the formation of the final container. However, it will be readily apparent that the increased number of redraws proportionally increases the cost of manufacturing such containers and the solution is relatively unsatisfactory from a commercial standpoint.

It is also possible to solve this problem of thinning or necking by providing a judiciously designed die assembly which prevents excess elongation of the plastic material during the drawing or forming operation. The cost of dies is generally relatively expensive, and it is therefore extremely desirable to avoid costly and/or intricately designed dies.

In accordance with this invention, it has been found that the application of a coating material in a generally regular pattern upon one of the surfaces of the plastic sheet causes an increase in the apparent ductility or drawability of the plastic sheet material without random thinning, necking or other deformations during drawing or redrawing operations. While this effect is significant, more phenomenal is the fact that certain patterns improve the drawing and redrawing characteristics of the plastic sheet whereas certain other patterns have little or no effect, and other patterns actually have drastically unfavorable effects as compared to an unprinted plastic sheet. Furthermore, this increase in the apparent ductility of the plastic material occurs only when the coating material is applied upon that surface of the plastic sheet which is ultimately formed into the inside surface of the finished container.

Therefore, in keeping with this invention it is a primary object to provide a novel method of forming plastic containers by applying a pattern of coating material to at least one surface of a generally thin, planar, drawable, smooth sheet of plastic material, and thereafter drawing the sheet in a conventional manner to form a container body with the coating material being located on the interior surface portion of the container body thereby preventing the fomation of conventional "neck" areas adjacent the juncture of conventionally drawn container bodies and the bottom walls thereof.

A further object of this invention is to provide a novel method of forming a plastic container in the manner heretofore described wherein the plurality of lines of coating material are applied as either intersecting, circular, radiating or similar patterns and combinations thereof.

A further object of this invention is to provide a novel method including each of the steps heretofore set forth wherein the coating material is enamel, lacquer, an emulsion of polyvinylidine chloride and similar coating materials impermeable to liquids and gases yet being flexible enough to withstand the drawing operations.

With the above and other objects in view that will hereinafter appear, the nature of the invention will be more clearly understood by reference to the following detailed description, the appended claims and the several views illustrated in the accompanying drawings.

In the drawings:

FIGURE 1 is a block diagram illustrating the steps followed in accordance with the method of this invention.

FIGURE 2 is a top perspective view, and illustrates the manner in which a roll of plastic material is printed and cut into sheets prior to a drawing operation.

FIGURE 3 is a schematic cross-sectional view of a conventional die assembly, and illustrates a drawn container positioned between a male punch and female die prior to the redrawing operation.

FIGURE 4 is a sectional view of the redrawn container body formed by the operation of the die of FIGURE 3, and illustrates the pattern of the lines of coating material in the finally formed container body.

FIGURES 5 and 6 are top plan views of two other sheets of plastic material, and illustrate two different patterns of lines of coating material applied to surfaces thereof.

Reference is first made to FIGURE 2 of the drawings which illustrates a planar, rectangular or square sheet 10 of plastic material, such as polycarbonate, acrylonitrile-butadienestyrene, polyvinyl chloride, or similar plastic material. The sheet 10 includes an upper surface 11 which is relatively smooth, though the lower surface (unnumbered) need not be smooth and can be relatively rough, rippled or of an "orange-peel" appearance.

A regularly arranged pattern of intersecting lines 12, 13 of coating material are disposed on the upper surface 11 of the sheet 10. The plurality of lines of coating material 12, 13 intersect each other at substantially right angles to set off substantially square or polygonal uncoated surface areas 14. Because the lines of coating material 12, 13 are applied to the surface 11 of the plastic sheet 10, the lines 12, 13 form raised portions projecting above the surface 11.

The lines of coating material 12, 13 can be applied to the surface 11 of each of the eventually formed plastic sheets 10 by any one of a plurality of conventional coating or printing processes as, for example, by conventional silk screen or gravure printing processes.

In the illustrated embodiment of the invention, the individual sheets 10 are formed from a roll 15 from which a web 16 is drawn and advanced from left-to-right by a pair of feed rolls 17, 18. The web 16 is fed between an underlying support or platen 20 and in overlying printing roller 21 having a raised pattern 22 corresponding to the eventual pattern applied to the surface 11 of the sheet 10. The printing roll 21 is, of course, driven in a suitable conventional manner in synchronism with the movement of the web 16 to prevent blurred or fuzzy patterns. The coating material is contained in a conventional reservoir 23 and is applied to the pattern 22 of the printing roll 21 by a porous applicator 24, or similar conventional means.

The particular type of coating material employed may vary but must be impermeable to liquids and gases, have the approval of the Federal Drug Administration, and be flexible enough to withstand subsequent drawing and redrawing operations. One such coating material found satisfactory is polyvinylidine chloride (PVdC) identified as Rhoplex R-9 which is manufactured and distributed by Rohm & Haas. A coating material found satisfactory in actual practice consisted of:

| | Parts by weight |
|---|---|
| Rhoplex R-9 (emulsion) | 95 |
| Cyclohexanone | 2.5 |
| Elvanol 51-05 (15% solution) | 2.5 |
| Water to a viscosity of 40 cps. | |

In actual practice the roll 15 was Lexan type 100-111 polycarbonate which was gravure coated with the PVdC by means of an ATF machine to a coating weight of 0.3-0.4 pound per thousand square inches.

Afer the web 16 has been coated, a conventional shear 25 or similar means may be employed to cut the web into the individual coated sheets 10. If found necessary, the coated web 16 may be first fed through an oven to drive off the solvents of the coating material and dry the same prior to the severing operation.

In addition to the gravure coating techniques, sheets were coated by conventional spray coating techniques requiring an alteration in the coating material heretofore described by changing the water to 300 parts by weight.

Similar coated sheets were also formed by conventional silk screen techniques employing blue silk screen enamel manufactured by the Sinclair-Valentine Compouny, the viscosity of the enamel being adjusted to produce lines corresponding to the lines 12, 13 which ranged in thickness or height from between 0.0005 to 0.0015 inch, and in width between 0.0015 to 0.0020 inch. The distance between adjacent ones of the lines 12 and adjacent ones of the lines 13 was 5 millimeters.

The sheets of plastic material so coated were then subjected to drawing and redrawing operations to form a container corresponding to the container 30 shown in FIGURE 4 of the drawings. Since both the drawing and redrawing dies are of similar construction, only the redrawing die has been illustrated in FIGURE 3 of the drawings to which reference is now made in conjunction with a similar die assembly disclosed in applicant's commonly assigned Patent No. 3,231,937, issued Feb. 1, 1966.

The die assembly whether for performing a drawing operation or a redrawing operation is generally designated by the reference numeral 40 and comprises a lower die body 41 and an upper die body 42. The lower and upper die bodies 41, 42 respectively, are arranged in axial alignment and are relatively reciprocally mounted in a conventional press in a well known manner.

The lower die body 41 is attached to a bolster plate B which is in turn securely fastened to the conventional press (not shown) in a well known manner. The lower die body 41 is preferably attached to the bolster plate B by passing a plurality of bolts (not shown) through a plurality of openings (also not shown) in a base plate 43 of the lower die body 41, and threadably engaging these bolts in asosciated threaded bores (not shown) in the bolster plate B.

A plurality of identical vertical guide pins 44 are secured to the base plate 43 of the lower die body 41. The number of guide pins 44 may vary, but there are preferably four such guide pins 44 provided, and each guide pin 44 is received in an identical vertical bore or opening 45 of an upper reciprocal plate 46 of the upper die body 42.

The upper reciprocal plate 46 of the upper die body 42 includes an upwardly directed axial stem 47 having an axial bore 48. A conventional vertically reciprocal ram R of teh press surrounds the stem 47, and is secured to the upper reciprocal plate 46 of the upper die body 42 by a plurality of bolts in much the same manner as that heretofore described relative to the base plate 43 and the bolster plate B.

A generally cylindrical tubular draw punch or female die 50 is conventionally secured in a downwardly opening circular recess 51 of the upper die body 42. The draw punch 50 includes an inner circumferential wall 52 defining guide bore or chamber 53, an outer circumferential wall 54 and a lower annular end wall or face 55.

A knock-out head 56 of a knock-out pad 57 is mounted for reciprocal movement in the guide bore 53 of the draw punch 50. A stem 58 of the knock-out pad 57 is slidably received in the axial bore 48 of the stem 47 and projects outwardly thereof. The exposed upper end portion of the stem 58 projecting outwardly from the bore 48 of the stem 47 is normally urged downwardly by a compression spring to the position illustrated in FIGURE 3 to normally maintain a circular end face or wall 60 of the knockout head 56 flush with the annular face 55 of the draw punch 50.

A generally cylindrical tubular retainer 61 is secured in a conventional manner in a circular recess 62 of the base plate 43. The retainer 61 includes an inner circumferential wall 63 defining a guide bore or chamber 64. The inner circumferential wall 63 terminates at an inwardly directed peripheral flange 65 which forms a stop for limiting the upward reciprocal movement of the draw ring 66 reciprocally mounted in the chamber 64 of the retainer 61.

The draw ring 66 is in axial alignment with the draw punch 50 of the upper die body 42 and includes a vertical axial bore or opening 67 which is in axial alignment with the guide bore 53 of the draw punch 50. An annular end face or wall 68 of the draw ring 66 opposes the annular end face 55 of the draw punch 50. In the case of operating as a redrawing die, an outer circumferential wall 70 of the draw ring 66 is contoured to mate with an internal surface (unnumbered) of an inverted previously drawn plastic container C. When functioning as a drawing die, the size of the circumferential wall 70 is basically immaterial since the planar flat sheet 10 is simply clamped between the surfaces 55, 68 of the draw punch 50 and the draw ring 66, respectively. An annular flange 71 of the draw ring 66 normally abuts the under surface of the flange 65 of the retainer 61 to limit the upward movement of the draw ring 66 with respect to the retainer 61. A plurality of identical draw ring guide pins 72 are conventionally secured to and depend from the flange 71 of the draw ring 66. Each guide pin 72 passes through an identical vertical bore 73 in the base plate 43 of the lower die body 41, and each guide pin 72 is secured to a conventional air cushion pressure pad 74.

The die center pad or male punch 75 is secured to the base plate 43 of the lower die body 41 in axial alignment with the guide bore 53 of the draw punch 50.

The die center pad 75 is simply a generally cylindrical elongated body 76 terminating at one end portion in a generally circular end face 77 and at an opposite end portion in a generally circular securing flange 78 which is received in a recess 80 of the base plate 13, and is suitably conventionally secured thereto.

At the beginning of the drawing operation, the ram R is positioned as shown in FIGURE 3 in order that the plastic sheet 10 can be positioned between the draw punch 50 and the draw ring 66. It is important to note that the sheet 10 is positioned with the lines 12, 13 of coating material in direct opposed contacting engagement with the surface 68 and the end face 77 of the male punch 75.

As the ram R is then reciprocated downwardly, the planar coated sheet 10 is clamped between the surfaces 55, 68 after which continued downward movement urges the draw ring 66 outwardly and causes the sheet to be drawn to a cup-like configuration as the male punch 75 enters the chamber 53 of the draw punch 50. Upon reverse movement of the ram R the knock-out pad automatically removes the drawn container from the chamber 23, and at this time the drawn container is of the configuration shown in FIGURE 3.

The drawn container is then placed upon the draw ring 36 with the inner coated surface opposing the circumferential wall 70 and the bottom wall inner coated surface opposing the face 68 and the end surface (unnumbered) of the die 75. Thereafter the ram R is again cycled in the manner described in the latter-noted patent resulting in the formation of the redrawn container 30 of FIGURE 4. Thereafter the method is concluded by simply conventionally trimming the flange (unnumbered).

In addition to performing the method heretofore described in conjunction with the sheet 10, other sheets were coated with different patterns to determine the drawing and/or redrawing characteristics thereof compared to similar though uncoated plastic sheets. The plastic sheet 10 having 5 millimeter squares was rated as Good and given a rating number of "3" with the rating number "1" being highest and the number "5" being lowest. A similar plastic sheet (no shown) having vertical and horizontal lies of coating corresponding to the lines 12, 13 setting off 2 millimeter squares was rated Superior, with a rating number of "1."

The second ranking coated sheet is shown in FIGURE 5, and in this case the lines of coating material radiate from a single central point and there are 24 such lines spaced 15° from each other. A plastic sheet (FIGURE 6) with 12 radial lines (30° angle) and concentric circles (10 millimeter diameter change) was rated "4" and Satisfactory, while another sheet (not shown) which included 12 radial lines spaced from each other 30° was ranked fifth and determined to be Below Average.

From the foregoing the relative drawing and redrawing characteristics are significant since they represent a comparison between plastic sheets which each have a particular pattern of coating material applied to a surface thereof, and not a comparison between such plastic sheets and uncoated conventional plastic sheets. Therefore, though the last pattern rated fifth is generally below average as compared to the sheet rated number 1, the below average rating of the last rated pattern is above and possesses redrawing charcteristics beyond those of an uncoated conventional drawable plastic sheet.

A plurality of containers have been drawn in dies of the type heretofore described by beginning with a plastic sheet having a pattern of silk screen enamal thereon as shown in FIGURE 6. The silk screen enamel was between 0.0005 to 0.0015 inch thick with the concentric circles or lines spaced 10 millimeters apart and the outermost line being approximately 15 centimeters in diameter and 12 radial lines spaced apart 30°. The sheet was drawn with the lines of coating material on the inside of the container (opposing the die center pad), and in each case containers were drawn without the conventional neck portion of thin material being produced adjacent the bottom wall thereof.

On the other hand, substantially identical sheets of polycarbonate but without the lines of coating material were drawn in a conventional die, and the containers produced therefrom were necked or thinned adjacent the bottom walls and/or the bottoms of the containers were torn or punched out.

Since all of the conditions except the presence or absence of the coating material on the plastic sheets were substantially identical, only the coating material, the particular pattern thereof, and its relationship to the die center pad had the phenomenal effect of increasing the apparent ductility and drawability of the polycarbonate sheets.

It is believed apparent from the foregoing that there has been provided various forms of novel coated plastic sheets wherein a particular pattern of lines of coating material formed on a surface thereof prevent the formation of a neck or thin material in a container wall when drawn or redrawn with the coated side of the sheets opposing the male punch. While this problem of thinning or "necking" has been solved by the provision of relatively regular patterns of coating material applied to sheets of plastic material, and the coatings have been applied in lines which either intersect, radicate from an apex, or are concentric circles, other configurations or patterns are considered within the scope of this invention. For example, serpentine or spiral-like lines of coating material might also be formed on the surface of a plastic sheet of material, and such sheets are considered within the method heretofore disclosed.

While preferred forms and arrangements of parts have been shown in illustrating the invention, it is to be clearly understood that various changes in details and arrangement of parts may be made without departing from the spirit and scope of the invention as defined.

I claim:

1. In a method of drawing plastic sheets between a male punch and female die to prevent irregular thinning, necking and loss of ductility which would otherwise weaken the material, the improvement comprising forming raised portions by applying a pattern of coating material to a sheet prior to drawing, positioning the sheet with the raised portions in opposed relationship to the male punch, and drawing the sheet to a cup-like configuration between the male punch and female die whereby during the drawing the plastic flow will be stable and the thickness of the body wall formed thereby will be substantially uniform throughout.

2. The method as defined in claim 1 wherein the cup-like contoured sheet is redrawn between a male punch and a female die with the raised portions of the contoured sheet in opposed relationship to the last-mentioned punch.

3. The method as defined in claim 1 wherein the cup-like contoured sheet is redrawn between a male punch and a female die with the raised portions of the contoured sheet in opposed relationship to the last-mentioned punch.

4. The method as defined in claim 1 wherein the coating material is applied in a pattern of intersecting lines.

5. The method as defined in claim 1 wherein the coating material is applied in a pattern of intersecting lines setting off generally polygonal uncoated areas.

6. The method as defined in claim 1 wherein the coating material is applied in a pattern of circular concentric lines.

7. The method as defined in claim 1 wherein the coating material is applied in a pattern of radiating lines.

8. The method as defined in claim 1 wherein the coating material is applied to the sheet in liquid form, and and further including the step of drying the coating material prior to the drawing thereof to the cup-like configuration.

9. In a method of drawing plastic sheets between a male punch and a female die to prevent irregular thinning, necking and loss of ductility which otherwise weaken the material, the improvement comprising forming raised portions on at least one of the surfaces of a sheet by appling a pattern of coating material to a sheet prior to drawing, positioning the sheet with said raised portions in opposed relationship to the male punch, and drawing the sheet to a cup-like configuration between the male punch and the female die whereby during the drawing the plastic flow will be stable and the thickness of the body wall formed thereby will be substantially uniform throughout.

10. The method as defined in claim 9 wherein the sheet is positioned with said at least one surface opposing said male punch, and the drawing takes place by relative movement between the male punch and said female die whereby the one surface becomes the interior surface of the drawn cup-like article.

11. In a method of drawing plastic sheets into plastic bodies each having a side wall, a bottom wall and a peripheral area adjacent the juncture thereof by drawing plastic sheets between a male punch and a female die to prevent irregular thinning, necking and loss of ductility which would otherwise weaken the material, the improvement comprising forming raised portions on a surface of a sheet of drawable plastic material by applying a pattern of coating material to said surface prior to drawing, positioning the sheet with said raised portions in opposed relationship to the male punch, and drawing the sheet to a cup-like configuration between the male punch and the female die whereby the plastic flow will be stable and the thickness of the plastic body formed thereby will be substantially uniform throughout.

References Cited

UNITED STATES PATENTS

| | | | |
|---|---|---|---|
| 1,924,316 | 8/1933 | High | 264—294 |
| 2,296,723 | 9/1942 | McClurg | 264—134 |
| 2,797,179 | 6/1957 | Reynolds | 264—296 XR |
| 2,919,467 | 1/1960 | Mercer | 18—12 |
| 3,042,562 | 7/1962 | Peterson | 264—320 |
| 3,141,913 | 7/1964 | Edwards | 264—210 |
| 3,264,392 | 8/1966 | Taplin | 264—231 |

FOREIGN PATENTS 474,001     1937     Great Britain.

ROBERT F. WHITE, Primary Examixner

R. R. KUCIA, Assistant Examiner

U.S. Cl. X.R.

117—7; 264—132, 296